(12) United States Patent
Lewandowski et al.

(10) Patent No.: US 10,743,372 B2
(45) Date of Patent: Aug. 11, 2020

(54) ELECTRIC HEATING DEVICE

(71) Applicant: TOTAL SA, Courbevoie (FR)

(72) Inventors: Alexandre Lewandowski, Pau (FR); Franck Rey-Bethbeder, Pau (FR); Dominique Delaporte, Pau (FR); Alain Lechon, Pau (FR); Maurice Geli, Lescar (FR); Yann Buzaré, Gelos (FR)

(73) Assignee: TOTAL SA, Courbevoie (FR)

( * ) Notice: Subject to any disclaimer, the term of this patent is extended or adjusted under 35 U.S.C. 154(b) by 967 days.

(21) Appl. No.: 15/104,171

(22) PCT Filed: Dec. 5, 2014

(86) PCT No.: PCT/FR2014/053186
§ 371 (c)(1),
(2) Date: Jun. 13, 2016

(87) PCT Pub. No.: WO2015/086963
PCT Pub. Date: Jun. 18, 2015

(65) Prior Publication Data
US 2016/0316518 A1 Oct. 27, 2016

(30) Foreign Application Priority Data
Dec. 12, 2013 (FR) ..................... 13 62509

(51) Int. Cl.
*H05B 3/14* (2006.01)
*H05B 3/58* (2006.01)
(Continued)

(52) U.S. Cl.
CPC ................ *H05B 3/14* (2013.01); *F16L 53/35* (2018.01); *F16L 53/38* (2018.01); *F24H 1/105* (2013.01);
(Continued)

(58) Field of Classification Search
CPC .......... F16L 53/35; F16L 53/38; F24H 1/105; H05B 2203/021; H05B 2203/034;
(Continued)

(56) References Cited

U.S. PATENT DOCUMENTS 3,800,121 A 3/1974 Dean et al.
3,943,273 A 3/1976 De Putter
(Continued)

FOREIGN PATENT DOCUMENTS

CN 2800021 Y 7/2006
DE 203 11 617 U1 12/2004
(Continued)

OTHER PUBLICATIONS

Search Report for related French Application No. FR 1362506 dated Jul. 22, 2014; 2 pages.
(Continued)

*Primary Examiner* — Dana Ross
*Assistant Examiner* — James F Sims, III
(74) *Attorney, Agent, or Firm* — Patterson Thuente Pederson, P.A.

(57) ABSTRACT

An electrical heating device comprising a support and a heating layer made of carbon fibre composite on the support mid connected to an electrical power supply to warm the device. The heating layer has a volume which comprises an electrically conducting circuit part which extends along at least one continuous line, and an electrically non-conducting insulation part which fills the remainder of the volume of the heating layer.

14 Claims, 3 Drawing Sheets

(51) Int. Cl.
  *F24H 1/10* (2006.01)
  *H05B 3/18* (2006.01)
  *H05B 3/36* (2006.01)
  *F16L 53/35* (2018.01)
  *F16L 53/38* (2018.01)

(52) U.S. Cl.
  CPC .............. *H05B 3/145* (2013.01); *H05B 3/18* (2013.01); *H05B 3/36* (2013.01); *H05B 3/58* (2013.01); *H05B 2203/021* (2013.01); *H05B 2203/034* (2013.01); *H05B 2214/02* (2013.01); *H05B 2214/03* (2013.01)

(58) Field of Classification Search
  CPC .. H05B 2214/02; H05B 2214/03; H05B 3/14; H05B 3/145; H05B 3/18; H05B 3/36; H05B 3/58
  See application file for complete search history.

(56) References Cited

U.S. PATENT DOCUMENTS

| | | |
|---|---|---|
| 2009/0107558 A1 | 4/2009 | Quigley et al. |
| 2010/0290764 A1 | 11/2010 | Borgmeier et al. |
| 2013/0025728 A1 | 1/2013 | Bigex et al. |
| 2013/0028580 A1 | 1/2013 | Bigex et al. |
| 2013/0048128 A1 | 2/2013 | Roederer et al. |
| 2013/0064528 A1 | 3/2013 | Bigex et al. |
| 2013/0087278 A1 | 4/2013 | Chang et al. |
| 2013/0108250 A1 | 5/2013 | Bigex et al. |
| 2013/0186884 A1* | 7/2013 | Barfuss ................ B23P 11/00 219/529 |
| 2013/0220994 A1* | 8/2013 | Hanada ................ H05B 3/845 219/553 |
| 2013/0336643 A1 | 12/2013 | Borgmeier et al. |

FOREIGN PATENT DOCUMENTS

| | | |
|---|---|---|
| DE | 20 2008 003 365 U1 | 8/2009 |
| DE | 10 2010 010 929 A1 | 9/2011 |
| FR | 2 132 759 | 11/1972 |
| FR | 2 220 120 | 9/1974 |
| FR | 2 958 991 A1 | 10/2011 |
| FR | 2 958 992 A1 | 10/2011 |
| FR | 2 958 994 A1 | 10/2011 |
| FR | 2 958 995 A1 | 10/2011 |
| GB | 2 403 995 A | 1/2005 |
| WO | WO 02/104074 A1 | 12/2002 |
| WO | WO 2006/077157 A1 | 7/2006 |
| WO | WO 2011/128544 A1 | 10/2011 |
| WO | WO 2011/128545 A1 | 10/2011 |
| WO | WO 2011/128546 A1 | 10/2011 |
| WO | WO 2011/128547 A1 | 10/2011 |

OTHER PUBLICATIONS

Search Report for related French Application No. FR 1362507 dated Aug. 19, 2014; 2 pages.
Search Report for related French Application No. FR 1362509 dated Jul. 25, 2014; 2 pages.
International Search Report for related International Application No. PCT/FR2014/053135 dated Mar. 9, 2015; 7 pages.
International Search Report for related International Application No. PCT/FR2014/053186 dated Apr. 7, 2015; 7 pages.
International Search Report for related International Application No. PCT/FR2014/053126 dated Mar. 10, 2015; 8 pages.

* cited by examiner

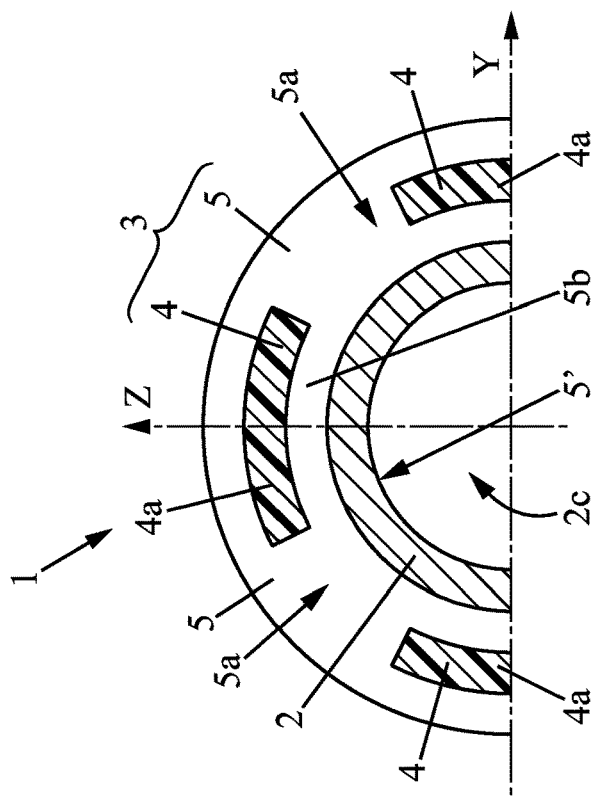
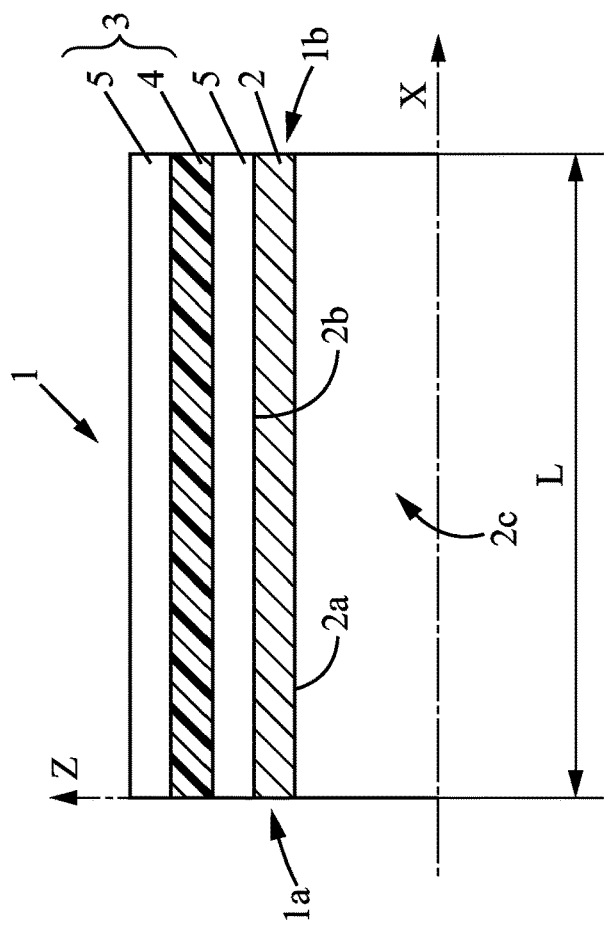
FIG. 1b
FIG. 1a

ELECTRIC HEATING DEVICE

RELATED APPLICATIONS

The present application is a National Phase entry of PCT Application No. PCT/FR2014/053186, filed Dec. 5, 2014, which claims priority from FR Patent Application No. 13 62509, filed Dec. 12, 2013, said applications being hereby incorporated by reference herein in their entirety.

FIELD OF THE INVENTION

The present invention relates to an electrical heating device, for example a heating conduit for the transport of a fluid requiring at least occasional warming, the said fluid comprising for example a hydrocarbon.

BACKGROUND OF THE INVENTION

The invention relates to an electrical heating device comprising:
  a support which extends along a surface,
  a heating layer situated on the said support, the said heating layer comprising a first electrically conducting material, the said first material comprising first carbon fibres embedded in a first polymer matrix, and the said heating layer being intended to be connected to an electrical power supply to heat the said device.

The device can take diverse forms. It can be a substantially plane plate, or a curved plate, or a flexible membrane made for example of elastomer, or a conduit.

A heating conduit is for example used for the transport of a fluid comprising a hydrocarbon, such as described in document FR-2958991. Indeed, these conduits are customarily used in very cold environments, on land and at sea, and sometimes at sea at a very great depth. Under these conditions, the fluid may either freeze, or coagulate, or exhibit the formation of paraffin or hydrates, and this may generate plugs and impede the transport of the fluid in the conduit. This is why conduits are sometimes warmed, for example by the Joule effect of an electric current passing along a conducting layer.

A heating flexible membrane or heating jacket is described in document FR-2958994. This heating jacket is for example wound around a non-heating conduit to warm the fluid.

All these devices comprise a carbon fibre heating layer which extends over the whole of the surface of their support.

SUMMARY OF THE INVENTION

The aim of the present invention is to enhance previous electrical heating devices.

For this purpose, a device of this type is characterized in that the heating layer has a volume which comprises:
  a circuit part composed of the first electrically conducting material and which extends along at least one continuous line between ends linked directly or indirectly to the electrical power supply, and
  an insulation part composed of a second electrically non-conducting material and which fills the remainder of the volume of the heating layer, the said insulation part electrically insulating the circuit part in the heating layer.

By virtue of these arrangements, the warming can be localized mainly in the surface of the heating layer corresponding to the circuit part. This makes it possible to adapt the heating device, to heat necessary zones only, and to expend less electrical energy.

Furthermore, this makes it possible to place several electrical lines in a single heating layer, and therefore to complicate the electrical circuit. In particular, it is possible to use a multiphase, two-phase or three-phase power supply. It is also possible to effect in the same heating layer the return of a first line in a second line. The electrical connection of the heating layer can thus be simplified and in particular localized at a single site of the electrical heating device.

Finally, this avoids having to stack several heating layers, insulated from one another by an intermediate electrical insulation layer. It is thus possible to obtain a heating device with a reduced thickness.

In diverse embodiments of the device according to the invention, it is optionally possible to have recourse furthermore to one and/or to the other of the following arrangements.

According to one aspect of the invention, the second material comprises second fibres embedded in a second polymer matrix, the said second fibres being electrically non-conducting.

According to one aspect of the invention, the second fibres are glass fibres.

According to one aspect of the invention, the polymer of the second matrix is identical to the polymer of the first matrix.

According to one aspect of the invention, the circuit part comprises at least two continuous lines separated from one another by separation portions of the insulation part.

According to one aspect of the invention, the circuit part comprises three continuous lines separated from one another by separation portions of the insulation part, each line being supplied by a phase of a three-phase power supply.

According to one aspect of the invention, each line comprises a line section in a plane substantially perpendicular to the surface, the said line sections being alternated with the insulation part separation portions in at least one first direction of the said plane substantially parallel to the surface.

According to one aspect of the invention, the line sections are alternately offset in a second direction substantially perpendicular to the first direction and in a direction opposite to the said second direction.

According to one aspect of the invention, the line sections all have substantially the same surface.

According to one aspect of the invention, the line sections have a shape at least twice as elongated in the first direction as in a second direction substantially perpendicular to the first direction.

According to one aspect of the invention, the heating layer is produced by deposition on the support of a plurality of first composite bands composed of the first material and of a plurality of second composite bands composed of the second material, positions of deposition of the said first and second composite bands determining the formation of the circuit part and of the insulation part of the heating layer.

According to one aspect of the invention:
  the support is a hollow tube extending in a longitudinal direction and intended to transport a fluid comprising a hydrocarbon, the said tube having at least one electrically insulating external surface, and
  the heating layer is substantially a layer of cylindrical shape above the tube.

According to one aspect of the invention, the line has a helix shape around the said tube, and the insulation part has a separation portion which extends between each turn of the helix.

According to one aspect of the invention, the support is a flexible membrane intended to cover at least one zone of a device for transporting a fluid comprising a hydrocarbon, and the heating layer is a layer which covers at least one face of the said membrane.

BRIEF DESCRIPTION OF THE DRAWINGS

Other characteristics and advantages of the invention will become apparent in the course of the following description of at least one of its embodiments, given by way of non-limiting example, with regard to the attached drawings.

In the drawings:

FIG. 1a is a longitudinal sectional view of a first embodiment of a composite heating conduit according to the invention;

FIG. 1b is a transverse side view of the conduit of FIG. 1a;

In the various figures, the same numerical references designate identical or similar elements.

DETAILED DESCRIPTION OF THE DRAWINGS

In the present description, the terms "front" and "rear" are used with respect to the longitudinal direction X. The terms "upper" or "upwards" and "lower" or "downwards" are used with respect to the vertical direction Z, upwards, perpendicular to the longitudinal direction X and to the transverse direction Y.

The electrical heating device of the present invention can be a heating jacket, a heating plate, a heating conduit, or any other device of arbitrary shape which comprises a surface covered with a layer termed the "heating layer". This heating layer comprises carbon fibres embedded in a polymer matrix, the said carbon fibres making it possible to pass an electric current which warms the layer through the Joule effect.

The term "jacket" of the present invention must be understood as being a device having a flexible membrane shape, being able to be deformed so as to surround or envelop a device for transporting a fluid, such as a conduit, a valve, or a well head.

The term "conduit" of the present invention must be understood as being a device comprising a tube for transporting a fluid at least between an inlet and an outlet, the device being able to comprise other elements, such as a valve, or multiple bypasses.

Document FR-2958991 describes a conduit comprising a single heating layer comprising carbon fibres to conduct electricity, and electrical insulation layers (made for example of glass fibre). It is possible to overlay several heating layers while inserting an insulation layer between each heating layer, so as to construct a multilayer conduit. For example, it is possible to have a conduit with two stacked heating layers, the second heating layer producing an electrical return to a single power supply end. For example, it is possible to have a conduit with three stacked heating layers, suitable for example for a three-phase power supply.

Figure 2:
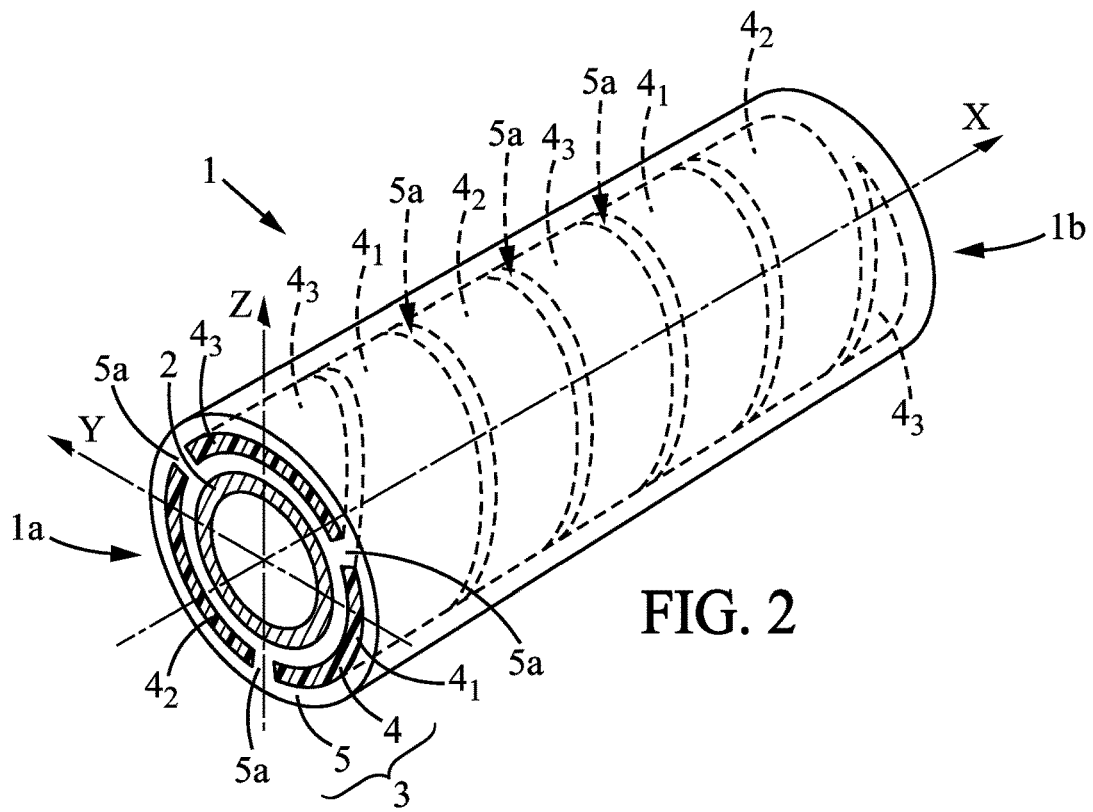
FIG. 2 is a perspective view of a second embodiment of a heating conduit according to the invention.

FIGS. 1a, 1b and 2 present a conduit 1 according to the invention in longitudinal section along the plane XZ and in transverse section along the plane YZ. In these figures, only an upper half above the X axis is presented, the other lower half being substantially identical by symmetry with respect to the X axis. However, it will be understood that any device with or without symmetry is possible.

The conduit 1 comprises a hollow tube 2, extending in the longitudinal direction of axis X between first and second ends 1a, 1b. This tube 2 comprises an internal surface 2a in proximity to the X axis, and an external surface 2b further from the X axis. Inside the internal surface 2a extends a cavity 2c between an inlet and an outlet of the cavity which are situated at each of the ends. The cavity 2c is adapted for transporting the fluid between the said inlet and outlet.

The conduit 1 has a section of substantially cylindrical shape in the YZ plane, but other shapes could be produced.

The tube 2 can be produced with an electrically conducting material, such as steel, as is represented in the figures.

The tube 2 can be produced with an electrically non-conducting (insulating) material, for example a polymer. This material can be a polyamide (PA), or a polyvinylidene fluoride (PVDF). This material can also be a composite material comprising fibres embedded in a polymer matrix. These fibres are for example made of glass.

The external surface 2b of this tube 2 is a support.

Around this support (for example on this support), there is at least one heating layer 3.

The conduit can comprise other layers. For example, the tube can be covered with a protection layer to limit the corrosion of the said tube, generally made of steel. For example, the tube can also be covered with an adhesion layer to facilitate the adhesion of the following layer (heating layer 3) on the said tube. For example, the conduit can also comprise a thermal insulation layer, for example above the heating layer 3. For example, the conduit can also comprise one or more electrical insulation layers, below or above the heating layer 3.

The heating layer 3 is a composite comprising at least one first electrically conducting material, composed of first carbon fibres embedded in a first polymer matrix. This polymer is advantageously an epoxy resin, a polyamide (PA), or a polyvinylidene fluoride (PVDF).

The carbon fibres are able to conduct an electric current to heat the tube through the Joule effect. The resistivity of the carbon fibres, having for example a value $\rho_{carbon\_fibre}=1.9\times10^{-5}$ $\Omega\cdot m$ at a temperature of 20° C., this being substantially 1100 times more resistive than copper at 20° C. This is why, when such a material is used to produce a heating layer, the latter covers the whole of the surface of the support over a certain thickness so as to obtain the desired lineal resistivity. However, this resistivity remains extremely low as compared with an insulating material such as glass. The resistivity of glass has for example a value $\rho_{glass}10^{17}$ $\Omega\cdot m$.

The heating layer 3 according to the invention is thus a composite which covers the tube 2, but it is more complex than those of the prior art. It comprises two parts in its volume:

a circuit part 4, produced with the first electrically conducting material, namely first carbon fibres embedded in a first polymer matrix, and an insulation part 5, produced with a second electrically non-conducting material, and which fills the remainder of the volume of the heating layer to electrically insulate the circuit part in the heating layer.

The circuit part 4 furthermore extends along at least one continuous line between ends which are linked directly or indirectly to means of electrical power supply which conveys the electric current to the heating layer 3 to heat the conduit 1.

The heating layer 3 according to the invention is therefore not a continuous layer of electrically conducting material covering the surface of the support (example: tube). The heating layer comprises at least one conducting circuit electrically insulated in a non-conducting material. It is thus possible to design a heating layer 3 with a circuit adapted for heating predetermined zones. Less electrical energy is thus expended.

The second material is advantageously composed of second fibres embedded in a second polymer matrix. These second fibres are electrically non-conducting (insulating).

The heating layer 3 is therefore a composite comprising two types of fibres: conducting fibres of carbon and non-conducting fibres. By virtue of this composite structure with fibres, the heating layer 3 is mechanically very resistant.

As a variant, the second fibres are made of glass or aramid (for example a para-aramid sold under the trade name kevlar). The heating layer 3 is thus still more mechanically resistant.

As a variant, the first and/or second fibres are a mixture of fibres. For example, the first fibres are a mixture of carbon fibres and of glass fibre, or a mixture of carbon fibres and of aramid fibres. For example, the second fibres are a mixture of glass fibres and of aramid fibres. The electrical conductivities of the circuit part 4 and of the insulation part 5 can thus be predetermined and each suitable for the application.

As a variant, the polymer of the second matrix and the polymer of the first matrix are identical. The heating layer 3 therefore forms a single composite with the same polymer matrix. This layer thus has continuity of material which renders it still more mechanically resistant.

The heating layer 3 of the conduit 1 is for example fabricated by known means using preformed bands of composite of two types (composed of the first material or of the second material), each preformed band extending along a direction and comprising fibres (carbon, glass or kevlar) embedded in a polymer matrix. The fibres are optionally oriented in the direction of the preformed band.

The volume of the heating layer 3 extends for example according to a constant thickness on the support (tube 2), in a direction perpendicular to its surface. The heating layer 3 of the conduit 1 is a cylindrical layer situated on the tube 2.

The heating layer 3 of the conduit 1 represented in FIG. 1b comprises a circuit part 4 comprising four lines arranged inside the heating layer 3, each line being covered on all its lateral sides by the insulation part 5. In particular, the insulation part 5 comprises separation portions 5a situated between each line so as to separate them from one another, and thus electrically insulate them.

However the heating layer 3 of the invention can comprise a single line, two lines, or three or more lines. The positions, longitudinal or transverse shapes of these lines can also vary.

By virtue of a single heating layer 3 which comprises several electrically conducting lines, the alternate stacking of heating layers and of insulation layers of the prior art is avoided, in which these layers cover the whole of the surface of the support each time. The heating device according to the invention therefore has a lower thickness (smaller dimension in the second direction R1).

For example, each line of the circuit part 4 can be a substantially rectilinear line which extends in the longitudinal direction X, or a line which extends in a direction inclined with respect to the longitudinal direction X.

In the sectional view of FIG. 1b, in a plane perpendicular to the longitudinal direction X, each line has a line section 4a having a predetermined shape, for example a rectangle shape or a curved rectangle shape so as to match the shape of the tube. This line section 4a makes it possible to pass the electric current necessary for the warming of the conduit 1.

As a variant, each line can extend according to a predetermined arbitrary curve above the support (tube 2).

Each line forms a conducting element or wire of a circuit.

The ends of the lines are able to be linked directly or indirectly to means of electrical power supply so as to pass current.

The type of electrical power supply (DC current, AC current, two-phase or three-phase current) is suited to the number of lines in the circuit part 4 and to their characteristics (line section 4a, line length, resistivity of the material).

Line ends situated at a single end of the conduit are optionally mutually interconnected to form a star electrical circuit better suited to a power supply of multiphase type. The electrical connection is thus simplified, and on just one side of the device 1.

As a variant, the lines are mutually independent. Optionally, the power supply comprises switching means for supplying one or more of the available lines. The heating of the device can thus be regulated.

In FIG. 2, the conduit 1 comprises a circuit part 4 which comprises three reference lines $4_1$, $4_2$ and $4_3$.

Each line forms a helix around the tube 2 which extends turn after turn around the tube in the longitudinal direction X. The helixes of the three lines are nested one in the other, so that in the longitudinal direction X the lines $4_1$, $4_2$ and $4_3$ are alternated. The first and second ends 1a, 1b thus have like line sections in their transverse section.

The insulation part 5 of the heating layer 3 of this heating conduit 1 comprises separation portions 5a which extend between each turn of the helix of a line and/or between each line $4_1$, $4_2$ and $4_3$. The turns of the helix of a line are insulated from one another, and the lines are insulated from one another.

This conduit 1 with three lines is advantageously supplied with a three-phase electrical power supply.

In FIGS. 3a to 3f are represented variants of cuts of a heating device 1, making it possible to illustrate variants of positions and shapes of line sections 4a of the said device.

For example, the representations of these sections correspond to sections of cylindrical conduits represented developed according to a first rectilinear direction T corresponding to a direction tangential to the conduit. The second directions R1, R2, R3 correspond to radial directions of the conduit.

Figure 4:
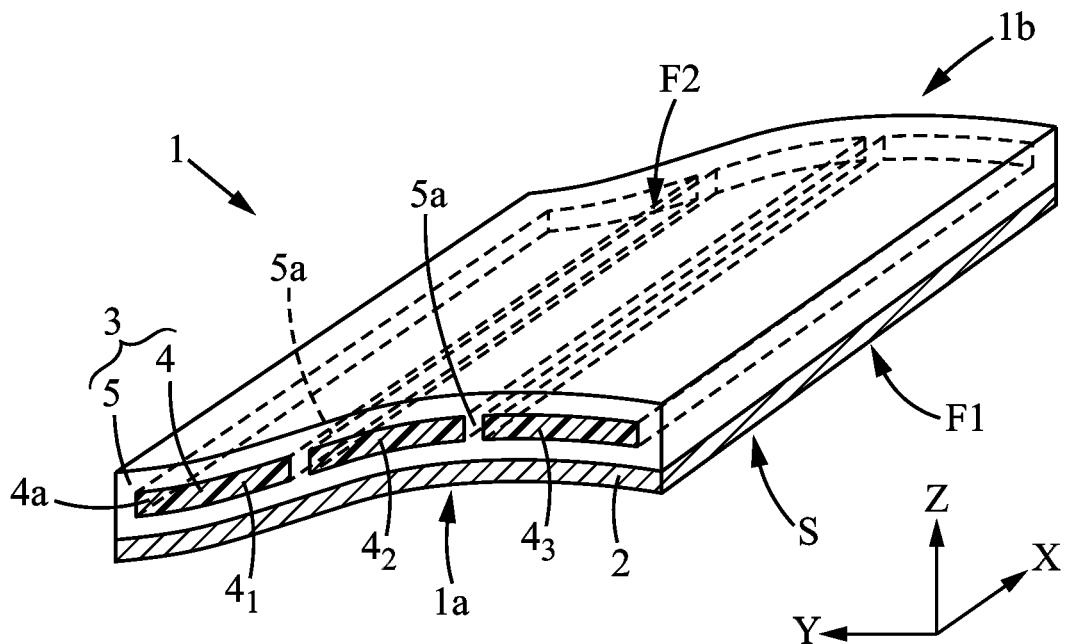
FIG. 4 is a perspective view of an embodiment of a heating jacket according to the invention.

For example, these representations can thus also correspond to sections of substantially plane heating jacket and such as described further on, and illustrated in FIG. 4, the first direction corresponding to a direction in the plane of the jacket (surface S), and the second direction R1 corresponding to a direction perpendicular or normal to this surface.

These figures can thus represent cuts of conduits having two lines. In this case, it is considered that the direction R1 corresponds to an angular position of 0°, that the direction R2 corresponds to an angular position of 180°, and that the direction R3 corresponds to an angular position of 360°. But, these figures can represent cuts of conduits with fewer lines or more lines, the pattern being repeatable or periodic. It suffices to define the values of the angular positions of the directions R1, R2 and R3.

Figure 3A:
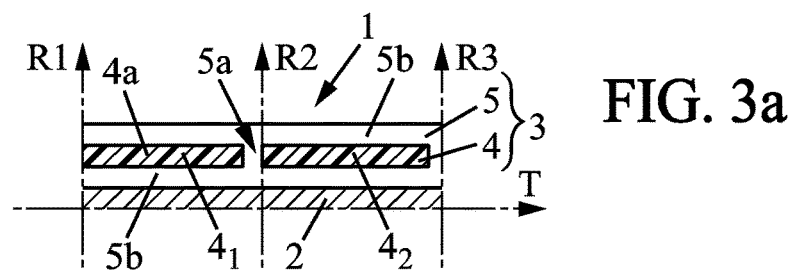
FIGS. 3a to 3f are transverse views of heating layers of heating devices such as a conduit or jacket.

According to a first variant in FIG. 3a, the line sections 4a of the two lines $4_1$ and $4_2$ are rectangular segments separated and insulated from one another in the first direction T by the separation portion 5a of the insulation part 5.

The lines $4_1$ and $4_2$ are also separated or insulated in the second directions R1, R2, R3 by insulation layers 5b of the insulation part 5.

These separations or insulations are filled with the second electrically non-conducting material of the insulation part 5. Thus, the lines are enveloped in this electrical insulation material.

Figure 3B:
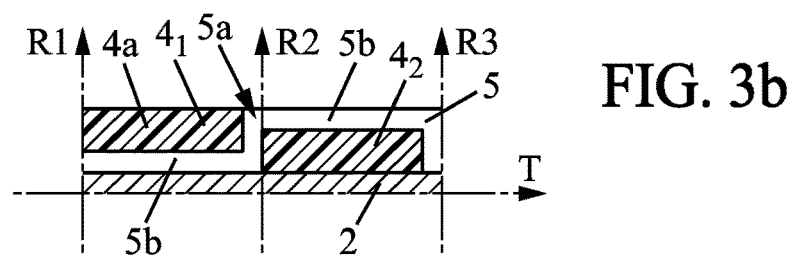

According to a second variant in FIG. 3b, the line sections 4a are moreover offset in the second direction R1 alternately (one out of two in the first direction T). The insulation part 5 has a hooked or notched shape passing below a first line and then above a second adjacent line (alternately above and below the lines).

Figure 3C:
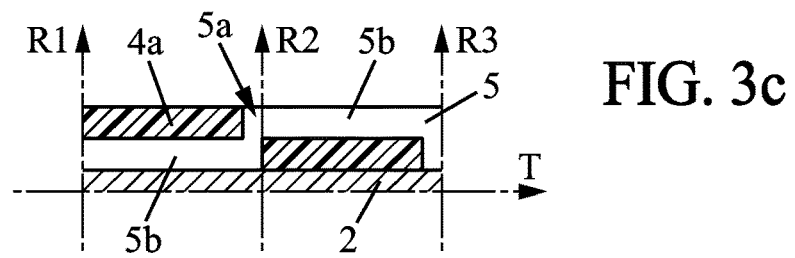

According to a third variant in FIG. 3c, the thicknesses in the second direction R1 of the lines (circuit part 4) and of the insulation part 5 are identical. Each line thus has a thickness of half the thickness of the heating layer 3.

Figure 3D:
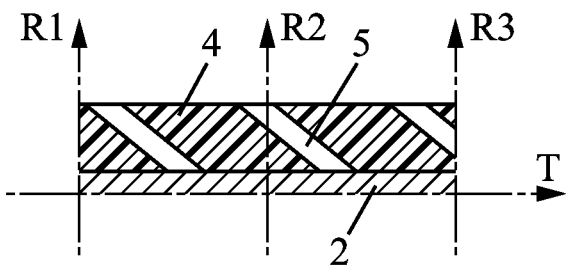

According to a fourth variant in FIG. 3d, the line sections 4a are no longer rectangular but lozenge shaped, so that they have inclined faces with respect to the second direction R1.

Figure 3E:
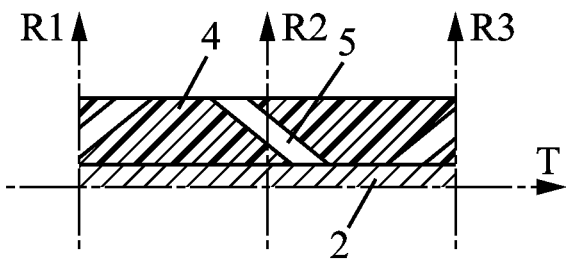

According to a fifth variant in FIG. 3e, the line sections 4a have a trapezium shape. The line sections 4a are alternately (one out of two in the first direction T) inverted. A second line has an inverted trapezium shape with respect to that of a first line. The successive and adjacent trapezia combine so that the separation portion 5a which separates them has a substantially constant thickness.

Figure 3F:
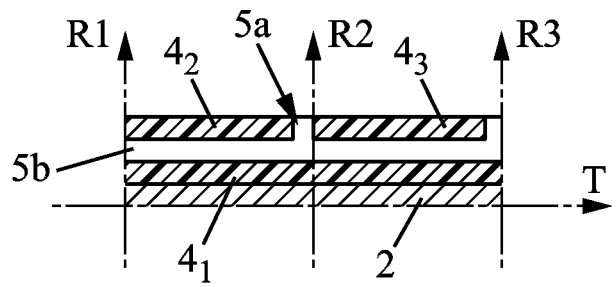

According to a sixth variant in FIG. 3f, the line sections 4a have different surfaces and/or shapes. For example, a first line $4_1$ close to the support 2 covers it entirely. Thereafter, an insulation layer 5b of the insulation part 5 entirely covers this first line. Next, several lines $4_2$, $4_3$ are situated on this insulation layer 5b and are separated from one another by separation portions 5a.

In this sixth variant, the first line $4_1$ as close as possible to the support 2 (tube) can have a different section from (and for example bigger than) each of the other lines $4_2$, $4_3$. The surfaces of the sections of each conducting line can thus be adapted to obtain a balancing of the electric currents in each of the lines so as to improve the heating of the support while reducing the transverse bulkiness.

For example, in multiphase power supply, it may be the return (or main) line and conduct a current equal to the sum of the currents of the other lines. Thus, the first line $4_1$ and the heating layer 3 are more effective in warming the support. Furthermore, the transverse (radial) bulkiness is reduced.

Optionally, the other lines $4_2$, $4_3$ are all situated in a single layer situated above the insulation layer 5b so as to optimize the effectiveness of the heating and to reduce the transverse (radial) bulkiness.

Optionally, in the case of a support of tube type, the other lines $4_2$, $4_3$ are wound helically around the tube of the conduit. The circulation of the fluid being in the substantially longitudinal direction of the tube, the heating of the conduit with lines wound helically around the tube is still more effective. This layout also makes it possible to obtain a more uniform heating, suitable for minimizing multiple cold points in the conduit. Helical winding also presents the advantage of allowing easier fabrication. Another advantage is to allow improved resistance and integrity of the layers, in comparison with an arrangement of the additional lines $4_2$ and $4_3$ in the direction parallel to the longitudinal axis of the tube where the risk of delamination of these lines (material layers) is higher.

Optionally, the electrical power supply is three-phase, and the heating layer comprises a first line $4_1$ and two other lines.

An advantage of all the configurations of this sixth variant is that of facilitating and optimizing the fabrication (manufacture) of various heating pipelines, thereby making it possible to decrease the manufacturing and storage costs. Indeed, it is possible to manufacture a first tube solely with the layer corresponding to the first line $4_1$ for the fabrication of a pipeline having a single heating line $4_1$. It is possible to use it to fabricate a pipeline suitable for a three-phase power supply by adding the insulant layers 5b and the other heating lines $4_2$ and $4_3$ to the said layer $4_1$ of this first tube.

FIG. 4 presents another type of electrical heating device 1 according to the invention: a heating jacket.

This substantially flexible heating jacket 1 extends along a surface S approximately in a plane XY. It comprises a first face F1 (lower face) and a second face F2 (upper face) in the direction Z.

In this direction Z, the heating jacket 1 consists at least:
of a substantially plane support 2, and
of a heating layer 3 on the said support 2.

The heating layer 3 comprises a circuit part 4 and an insulation part 5.

The circuit part 4 comprises at least one continuous line between ends linked directly or indirectly to the electrical power supply.

The insulation part 5 electrically insulates the line in the heating layer 3 at least in the directions of the surface S (plane XY of FIG. 4), by separation portions 5a.

By virtue of these arrangements, the heating layer 3 forms an electrical circuit which can be predetermined to warm certain zones more and to heat other zones less. A line can be the return of another, and the electrical connections are simplified and/or joined up on just one side of the device. The heating jacket comprises fewer overlaid layers (heating layer/insulation layer) and is therefore more flexible.

The geometric arrangements of the heating layer 3 in a transverse cut (plane XZ) can be similar to those described in FIGS. 3a-3f.

The arrangements of the component materials of the circuit part 4 and the insulation part 5 can be identical to the arrangements described in respect of the heating conduit 1 (FIGS. 1-2).

The matrix used for the diverse composite materials is advantageously a polymer of elastomer type. The jacket 1 is thus flexible.

All the variants envisaged in respect of the conduit 1 and its power supply are also possible in respect of the present heating jacket.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An electrical heating device comprising:
    a support which extends along a surface,
    a heating layer situated on the said support, the said heating layer comprising,
        a first electrically conducting material, the said first electrically conducting material comprising first carbon fibres embedded in a first polymer matrix, and the said heating layer configured to be connected to an electrical power supply to heat the said device,
        a first electric line close to the support and which covers the support entirely,
        an insulation layer belonging to an insulation part and which entirely covers the first electric line, and
        a second and a third electric line situated on the said insulation layer and separated from one another by separation portions,
    wherein the heating layer has a volume which comprises:
    a circuit part composed of the first electrically conducting material and comprising the first electric line, the second electric line and the third electric line which extend as three continuous electric lines between ends linked directly or indirectly to the electrical power supply, and
    an insulation part composed of a second electrically non-conducting material and which fills the remainder of the volume of the heating layer, the said insulation part electrically insulating the circuit part in the heating layer.

2. The device according to claim 1, in which the second material comprises second fibres embedded in a second polymer matrix, the said second fibres being electrically non-conducting.

3. The device according to claim 2, in which the second fibres are glass fibres.

4. The device according to claim 2, in which the polymer of the second matrix is identical to the polymer of the first matrix.

5. The device according to claim 1, in which the three continuous electric lines are separated from one another by separation portions of the insulation part, each line being supplied by a phase of a three-phase power supply.

6. The device according to claim 1, in which each electric line comprises a line section in a plane perpendicular to the surface, the said line sections being alternated with the insulation part separation portions in at least one first direction of the said plane parallel to the surface.

7. The device according to claim 6, in which the line sections are alternately offset in a second direction perpendicular to the first direction and in a direction opposite to the said second direction.

8. The device according to claim 6, in which the line sections all have the same surface.

9. The device according to claim 6, in which the line sections have a shape at least twice as elongated in the first direction as in a second direction perpendicular to the first direction.

10. The device according to claim 1, in which the heating layer is produced by deposition on the support, the heating layer including of a plurality of first composite bands composed of the first material and of a plurality of second composite bands composed of the second material, positions of deposition of the said first and second composite bands determining the formation of the circuit part and of the insulation part of the heating layer.

11. The device according to claim 1, in which:
    the support is a hollow tube extending in a longitudinal direction for transporting a fluid comprising a hydrocarbon, the said tube having at least one electrically insulating external surface, and
    the heating layer is a layer of cylindrical shape above the tube.

12. The device according to claim 11, in which the electric lines have a helix shape around the said hollow tube, and the insulation part has a separation portion which extends between each turn of the helix.

13. The device according to claim 1, in which the support is a flexible membrane intended to cover at least one zone of a device for transporting a fluid comprising a hydrocarbon, and the heating layer is a layer which covers at least one face of the said membrane.

14. An electrical heating device comprising:
    a support which extends along a surface, wherein the support is a hollow tube extending in a longitudinal direction and intended to transport a fluid comprising a hydrocarbon, the hollow tube having at least one electrically insulating external surface; and
    a heating layer situated on the said support, the heating layer having a cylindrical shape above the tube, the heating layer comprising;
        a first electrically conducting material, the first electrically conducting material comprising first carbon fibres embedded in a first polymer matrix,
        a first electric line close to the support and which covers the support entirely,
        an insulation layer belonging to an insulation part and which entirely covers the first electric line, and
        a second electric line and a third electric line situated on the insulation layer and separated from one another by separation portions, wherein the electric lines have a helix shape around the said tube, and the insulation part has a separation portion which extends between each turn of the helix,
    wherein the electrical heating device defines a volume, the volume comprises:
        a circuit part composed of the first electrically conducting material and the first electric line, the second electric line and the third electric lines which extend as three continuous electric lines between ends linked directly or indirectly to the electrical power supply, the three continuous electric lines separated from one another by separation portions of the insulation part, each of the three continuous electric lines being supplied by a phase of a three-phase power supply, and
        the insulation part composed of a second electrically non-conducting material and which fills the remainder of the volume of the heating layer, the insulation part electrically insulating the circuit part in the heating layer;
    and wherein, said heating layer is connected to an electrical power supply to heat the device.

* * * * *